Patented May 3, 1932

1,856,210

UNITED STATES PATENT OFFICE

HANS COLOMBARA, OF LEVERKUSEN-ON-THE-RHINE, GERMANY, ASSIGNOR TO GENERAL ANILINE WORKS, INC., OF NEW YORK, N. Y., A CORPORATION OF DELAWARE

MANUFACTURE OF NEW ISATINES

No Drawing. Application filed March 22, 1929, Serial No. 349,273, and in Germany March 27, 1928.

The present invention relates to a process of preparing substituted isatines from oxaminic acid halogenides of primary aromatic amines and to new substituted isatines being obtainable thereby.

I have found that substituted isatines are obtainable in a convenient manner and in most cases with an excellent yield by reacting upon a salt of a compound of the probable formula:

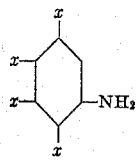

wherein $x$ stands for hydrogen or a monovalent substituent such as $-CH_3$, $-C_2H_5$, $-Cl$, $-NO_2$, $-OCH_3$ and the like, at least one $x$ being a monovalent substituent or two vicinal $x$'s stand for the grouping

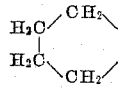

and the others for hydrogen or a monovalent substituent, with an oxalylhalogenide, and treating the oxaminic acid halogenide thus obtainable with an aluminium halogenide.

I prefer to perform the reaction in the following manner. The aromatic amine is transformed into a salt, especially a salt with an inorganic acid, such as hydrochloric acid, sulfuric acid and the like, according to the usual methods, and the salt is caused to react with the oxalylhalogenide (such as the bromide or chloride) in a suitable inert organic solvent, such as nitrobenzene, chlorobenzene, o-dichlorobenzene, trichlorobenzene, carbondisulfide, or the like. Obviously it is not necessary, to isolate the salt before carrying out the reaction with the oxalylhalogenide, but its formation can easily be performed in the same solution in which the reaction with the oxalylhalogenide is carried out. The temperatures to be applied may vary in wide limits, mainly depending on the stability of the oxaminic acid halogenides being formed, but will range in most cases between room temperature and about 50° C.; higher temperatures will in some cases be useful in order to accelerate the reaction. After the formation of the oxaminic acid halogenide an aluminium halogenide, preferably aluminium chloride or bromide is added, and ring formation is effected at normal or elevated temperature, the most suitable temperature being also in this case dependent on the stability of the oxaminic acid halogenide present. In most cases I prefer temperatures between about 40–80° C., so that the reaction will be complete in a rather short time, say about 1–10 hours. The working up of the reaction mixture is then performed according to known methods, for instance, by adding diluted hydrochloric acid, filtering and removing the solvent used by steam distillation.

In this manner a large number of substituted isatines is obtainable of good purity and in an excellent yield, which are unknown or can only be obtained in very small yields when being prepared according to other methods.

The isatines thus obtainable form after recrystallization yellow to blueish red crystals, dissolving in caustic soda lye with red to Bordeau-red colorations which soon change to yellow or become colorless with the formation of the corresponding isatinic acids.

The following examples will illustrate my invention, without limiting it thereto:

*Example 1.*—50 parts by weight of symmetrical m-xylidine (1.3.5) are dissolved in 300 parts by weight of nitrobenzene and hydrochloric acid is passed through the solution at ordinary temperature until conversion into the hydrochloric acid salt is complete. 63 parts by weight of oxalyl chloride or the equivalent quantity of oxalyl-bromide are then added with cooling, and stirring is effected at room temperature until a clear solution is produced. 65 parts by weight of aluminium chloride or the equivalent amount of aluminium bromide are then added fairly quickly at a low temperature, whereupon the mixture is heated to about 60° C., and stirred at this temperature until the formation of the isatine is complete. The reaction probably proceeds according to the following equation:

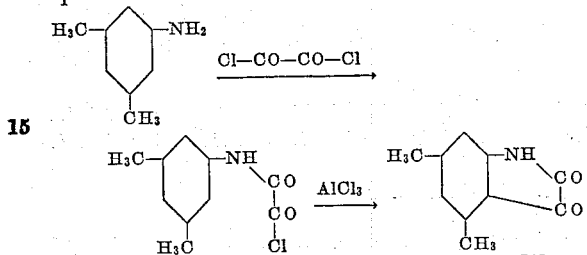

The reaction mass is then poured into dilute hydrochloric acid and filtered. The crude 4.6-dimethyl-isatine is purified in the customary manner. It crystallizes from glacial acetic acid in orange coloured prisms, which melt at 240° C. The yield amounts to about 75% of the theory.

*Example 2.*—75 parts by weight of oxalyl bromide are added with cooling to a suspension of 43 parts by weight of finely powdered m-toluidine hydrobromide in 200 parts by weight of chlorobenzene. The mixture is stirred at room temperature until complete solution takes place. After introducing 45 parts by weight of aluminium chloride the temperature is maintained for several hours at 65–70° C.; the reaction mass is then poured into dilute hydrochloric acid and the chlorobenzene driven off with steam. The crude isatine remaining is a mixture of 4-methylisatine and 6-methylisatine.

*Example 3.*—36 parts by weight of as-m-xylidine are dissolved in 250 parts by weight of nitrobenzene and by means of hydrochloric acid converted into the hydrochloric acid salt, which latter is converted into 2.4-dimethyl-1-phenyl-oximinic acid chloride by treatment with 45 parts by weight of oxalyl chloride.

The formation of the ring is effected by means of 45 parts by weight of $AlCl_3$ at 65–70° C. and after working up and purification 5.7-dimethylisatine is obtained in a satisfactory yield. The isatine crystallizes from glacial acetic acid in red needles, melting at 242° C.

*Example 4.*—45 parts by weight of p-xylidine are treated as described in Example 1 with hydrochloric acid, oxalyl chloride and aluminium chloride; while the ring formation is carried out, the temperature is advantageously maintained at about 70° C. After pouring the reaction mass into dilute hydrochloric acid the nitrobenzene is distilled off with steam and the crystalline crude product, which remains, is purified by redissolving in caustic soda lye and precipitation. The 4.7-dimethylisatine, which is readily obtained in this manner in a yield of 65% of the theory, crystallizes in orange red needles from glacial acetic acid and melts at 267° C.

*Example 5.*—40 parts by weight of pseudocumidine (1-amino-2.4.5-trimethylbenzene) are dissolved in 250 parts by weight of nitrobenzene and converted in the manner already described into isatine through the hydrochloric acid salt by treatment with 44 parts by weight of oxalyl chloride and 44 parts by weight of aluminium chloride. On pouring the reaction solution into dilute hydrochloric acid, the 4.5.7-trimethylisatine separates in small crystals and can be separated from the hydrochloric acid and the nitrobenzene by efficient filtration with suction. It crystallizes from glacial acetic acid in red needles, melting at 275° C. The yield amounts to about 80% of the theory.

In a similar manner many other isatines can be obtained for example:—

From m-chloro aniline the 6-chloro-isatine, crystallizing from glacial acetic acid in golden yellow needles, which melt at 260° C.

From p-aminoacetophenone the 5-acetylisatine, crystallizing from glacial acetic acid in reddish brown prisms, which remain unmelted at 350° C.

From tetrahydro-α-naphthylamine the 6.7-tetrahydro-benzisatine, crystallizing from glacial acetic acid in yellowish red prisms, which melt at 232° C.

From tetrahydro-β-naphthylamine the 4.5-tetrahydro-benzisatine, crystallizing from alcohol in orange coloured needles, which melt at 178° C.

From p-toluidine the 5-methylisatine, crystallizing from alcohol in red needles, which melt at 180° C.

From 4-chloro-3-amino-1-methylbenzene the 4-methyl-7-chloroisatine, crystallizing from alcohol in orange yellow needles, which melt at 246° C.

From 1.2-dimethyl-4-aminobenzene (o-xylidine) a mixture of 4.5- and 5.6-dimethylisatine.

From o-toluidine the 7-methylisatine, crystallizing from glacial acetic acid in orange red needles, which melt at 267° C.

From 6-chloro-2-amino-1-methylbenzene the 6-chloro-7-methylisatine, crystallizing from glacial acetic acid in red prisms, which melt at 245° C.

From 3-amino-4-methoxy-1-methylbenzene the 4-methyl-7-methoxyisatine, crystallizing from glacial acetic acid in red coarse needles, which melt at 235–236° C.

From 1-amino-2.3-dimethylbenzene (vic. o-xylidine) according to the method of example 1., the 6.7-dimethylisatine, crystallizing from glacial acetic acid in orange red prisms, which melt at 252° C.

I claim:

1. Process which comprises reacting upon a salt of a compound of the probable formula:

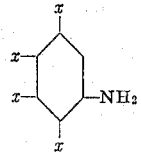

wherein at least one $x$ stands for a monovalent substituent of the group consisting of halogen atoms, alkayl-, nitro- and alkoxy groups and the remaining $x$'s stand for hydrogen, or two vicinal $x$'s stand for the grouping

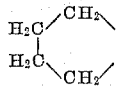

the other $x$'s meaning hydrogen or a monovalent substituent of the group consisting of halogen atoms, alkyl-, nitro- and alkoxy groups, with an oxalylhalogenide in an inert organic solvent and causing ring formation of the oxaminic acid halogenide formed, by means of an aluminium halogenide in the presence of an inert organic solvent.

2. Process which comprises reacting upon a mineral acid salt of a compound of the probable formula:

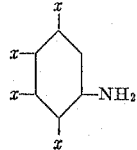

wherein at least one $x$ stands for a monovalent substituent of the group consisting of halogen atoms, alkyl-, nitro- and alkoxy groups and the remaining $x$'s stand for hydrogen, or two vicinal $x$'s stand for the grouping

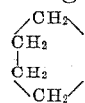

the other $x$'s meaning hydrogen or a monovalent substituent of the group consisting of halogen atoms, alkyl-, nitro- and alkoxy groups, with a compound of the formula $y$—CO.CO—$y$, wherein $y$ stands for chlorine or bromine in an inert organic solvent and causing ring formation of the oxaminic acid halogenide formed by means of a compound of the formula Al—$y_3$, wherein $y$ means chlorine or bromine in the presence of an inert organic solvent.

3. Process which comprises reacting upon a mineral acid salt of a compound of the formula:

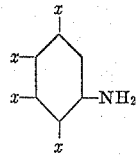

wherein at least one $x$ stands for a monovalent substituent of the group consisting of halogen atoms, alkyl-, nitro- and alkoxy groups and the remaining $x$'s stand for hydrogen, with a a compound of the formula $y$—CO.CO—$y$, wherein $y$ stands for chlorine or bromine in an inert organic solvent at a temperature between room temperature and about 50° C. and causing ring formation of the oxaminic acid halogenide formed by means of a compound of the formula Al—$y_3$, wherein $y$ means chlorine or bromine in the presence of an inert organic solvent at a temperature between about 40–80° C.

4. Process which comprises reacting upon a mineral acid salt of a compound of the formula:

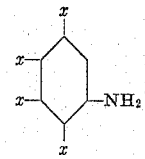

wherein at least one $x$ stands for a monovalent substituent of the group consisting of halogen atoms, alkyl-, nitro- and alkoxy groups and the remaining $x$'s stand for hydrogen, with compound of the formula $y$—CO.CO—$y$, wherein $y$ stands for chlorine or bromine in nitrobenzene solution and causing ring formation of the oxaminic acid halogenide formed by adding a compound of the formula Al—$y_3$, wherein $y$ means chlorine or bromine.

5. Process which comprises reacting upon a mineral acid salt of a compound of the formula:

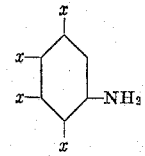

wherein at least one $x$ stands for a monovalent substituent of the group consisting of halogen atoms, alkyl-, nitro- and alkoxy groups and the remaining $x$'s stand for hydrogen, with a compound of the formula $y$—CO.CO—$y$, wherein $y$ stands for chlorine or bromine in nitrobenzene solution between room temperature and about 50° C., and causing ring formation of the oxaminic acid halogenide formed by adding a compound of the formula Al—$y_3$, wherein $y$ means chlorine or bromine and heating the mixture to about 40–80° C.

6. Process which comprises reacting upon a mineral acid salt of a compound of the formula:

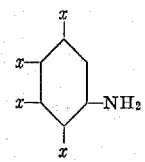

wherein the $x$'s stand for hydrogen or alkyl at least one $x$ being alkyl, with a compound of the formula $y$—CO.CO—$y$, wherein $y$ stands for chlorine or bromine an inert organic solvent and causing ring formation of the oxaminic acid halogenide formed, by means of a compound of the formula Al—$y_3$, wherein $y$ means chlorine or bromine in the presence of an inert organic solvent.

7. Process which comprises reacting upon a mineral acid salt of a compound of the formula:

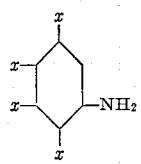

wherein the $x$'s stand for hydrogen or alkyl at least one $x$ being alkyl with a compound of the formula $y$—CO.CO—$y$, wherein $y$ stands for chlorine or bromine in an inert organic solvent at temperatures between room temperature and about 50° C., and causing ring formation of the oxaminic acid halogenide formed by means of a compound of the formula Al—$y_3$, wherein $y$ means chlorine or bromine in the presence of an inert organic solvent at a temperature between about 40–80° C.

8. Process which comprises reacting upon a mineral acid salt of a compound of the formula:

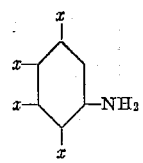

wherein the $x$'s stand for hydrogen or alkyl at least one $x$ being alkyl, with a compound of the formula $y$—CO.CO—$y$, wherein $y$ stands for chlorine or bromine in nitrobenzene solution and causing ring formation of the oxaminic acid halogenide formed by adding a compound of the formula Al—$y_3$, wherein $y$ means chlorine or bromine.

9. Process which comprises reacting upon a mineral acid salt of a compound of the formula:

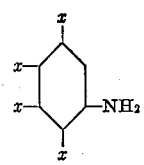

wherein the $x$'s stand for hydrogen or alkyl at least one $x$ being alkyl, with a compound of the formula $y$—CO.CO—$y$, wherein $y$ stands for chlorine or bromine in nitrobenzene solution between room temperature and about 50° C., and causing ring formation of the oxaminic acid halogenide formed by adding a compound of the formula Al—$y_3$, wherein $y$ means chlorine or bromine and heating the mixture to about 40–80° C.

10. Process which comprises transforming a compound of the group consisting of symmetrical m—xylidine (1.3.5) and vicinal o-xylidine (1.2.3) into the hydrochloric acid salt and reacting upon the latter in nitrobenzene solution with a compound of the formula $y$—CO.CO—$y$, wherein $y$ stands for chlorine or bromine at room temperature until a clear solution is produced, adding aluminiumchloride and causing ring formation to take place by heating to about 60° C.

11. As a new product 6.7-dimethylisatine, forming orange red prisms which melt at 252° C.

In testimony whereof I have hereunto set my hand.

HANS COLOMBARA. [L. S.]